US005694326A

United States Patent [19]

Warn et al.

[11] Patent Number: 5,694,326

[45] Date of Patent: Dec. 2, 1997

[54] FUEL PUMP - CARD READER CONTROL CENTER

[75] Inventors: Walter E. Warn, Knightdale; Fred K. Carr, Chapel Hill, both of N.C.

[73] Assignee: Progressive International Electronics, Raleigh, N.C.

[21] Appl. No.: 646,388

[22] Filed: May 8, 1996

[51] Int. Cl.[6] .................. G06F 3/00; G06F 17/00

[52] U.S. Cl. .................. 364/479.01; 364/479.02; 364/479.06; 364/479.11; 364/510

[58] Field of Search .................. 364/479.01, 479.02, 364/479.06, 479.11, 510

[56] References Cited

U.S. PATENT DOCUMENTS

| | | | |
|---|---|---|---|
| 5,208,742 | 5/1993 | Warn | 364/131 |
| 5,270,943 | 12/1993 | Warn | 364/479.11 |
| 5,299,135 | 3/1994 | Lieto et al. | 364/479.11 |
| 5,361,216 | 11/1994 | Warn et al. | 364/510 |
| 5,394,336 | 2/1995 | Warn et al. | 364/479 |
| 5,423,457 | 6/1995 | Nicholas et al. | 222/62 |
| 5,557,529 | 9/1996 | Warn et al. | 364/479.02 |

*Primary Examiner*—James P. Trammell
*Assistant Examiner*—Demetra R. Smith
*Attorney, Agent, or Firm*—Fred K. Carr

[57] ABSTRACT

The present invention relates to a fuel pump-card reader control center for controlling the fuel dispensing process and accepting payment for the fuel dispensed through a card reader. The control center has a microprocessor with read-only-memory (ROM) and read-and-write-memory (RAM). Operating routines are stored in ROM and operating code for controlling the dispensing process and accepting payment for the fuel dispensed is stored in RAM. The control commands for pump control and card reader control are down-loadable from magnetic medium or remotely though a modem interface. Configuration circuits translate the communication language of the fuel pump control commands and the card reader control commands into a communication format which is readable by the dispensers such that the control center can control dispensing process of different dispenser brands and accept payment for the fuel dispensed. Response data from the dispensers is stored in the RAM, and is transmitted to a computer through a driver, where the computer is performing cash register function. The fuel pump-card reader control center is particularly well suited for use with a c-store point-of-sales application programs for controlling the dispensers. An external version of the controller has serial connection to the computer and an internal version resides in an expansion slot and has a bus interface connection to the computer.

21 Claims, 8 Drawing Sheets

FUEL PUMP - CARD READER CONTROL CENTER

RELATED PATENTS

U.S. patent application Ser. No. 08/368,904 entitled "In-Dispenser-Card-Reader Control System" filed Jan. 5, 1995 in the names of Walter E. Warn and Fred K. Carr.

FIELD OF THE INVENTION

The present invention relates to a device and method for controlling fuel dispensers, and more particularly, to a fuel pump and card reader control center for controlling dispensers equipped with card readers having down-loadable pump and card reader control software.

BACKGROUND OF THE INVENTION

There are several commercial brands of fuel dispensers used in the retail petroleum industry to dispense fuel to the public. These dispensers are manufactured by different manufacturers including Gilbarco, Tokheim, Wayne Dresser, and others. The dispensers are most often controlled by a remote dispenser controller located such that the site attendant can monitor and control the dispensers from a building at the site. The dispenser controller is generally a microprocessor (MP) based system with read-only-memory (ROM) and read-and-write-memory (RAM) for writing, reading, and storing information. The controller sends data signals (commands) to the dispensers including price to charge for the fuel dispensed, preset amounts of fuel to dispense, and pump authorization to dispense fuel. The dispensers likewise send data signals (responses) to the controller including pump number, pump status, and dispensed fuel volume and value.

The dispenser manufacturers have a proprietary communication protocol (which is made available to others in the industry at request) for communicating between their dispensers and the controller. Certain dispenser manufacturers use current loop communication, others use voltage level communication, and other a combination thereof. Many newer dispenser models include a card reader means for reading credit and debit cards, and a cash acceptor for accepting bills for the fuel dispensed. These systems generally include a card reader, a cash acceptor, input keys for selecting the type payment desired, a display for prompting the customer, and a printer for printing a receipt of fuel dispensed. A fuel dispenser with a card reader/cash acceptor therefore performs two functions: it dispenses the fuel and it can accept payment for the fuel dispensed when the card reader is used.

One type of dispenser controller which has gained wide spread popularity during recent years is the personal computer (PC). The PC is particularly well suited for this since it can simultaneously perform other functions including cash register, scanning, wet and dry stock inventory, accounting, payroll, as well as other modules. The present invention relates to a fuel pump- card reader control center for interfacing the fuel dispensers and computer/cash register system to control the dispensing process and accept payment for the fuel dispensed when a credit/debit card is used.

U.S. Pat. No. 5,299,135 issued to Lieto et. al relates to an interface unit for regulating the exchange of information between a fuel pump and a PC. The present disclosure improves on the Lieto patent by including a first configuration means for translating the dispenser protocol between the dispenser and controller, and a second configuration means for translating the communication protocol between the controller and the card reader. This method allows the same controller to control different dispenser brands.

U.S. Pat. No. 5,270,943 entitled Fuel Pump Control Card having a common inventor and assignee discloses and claims a dispenser control system for controlling different dispenser brands through a pump control card interfaced to a point-of-sales (POS) system. The present invention improves on that disclosure by accepting payment for the dispensed fuel as well as controlling the dispensing function.

SUMMARY OF THE INVENTION

In summary, the present invention provides a fuel pump-card reader control center used in combination with a computer for controlling the fuel dispensing process and accepting payment for the fuel dispensed through a credit card reader. The control center uses a microprocessor with read-only-memory (ROM) for storing system operating code, and read-and-write-memory (RAM) for storing control code for controlling the dispensing process and accepting payment for the fuel dispensed. The control software for pump control and card reader control is down-loadable from magnetic medium or remotely through a modem interface. The center uses configuration circuits to translate the communication protocol of the control center into a current or voltage so that control center can control the dispensing process of various dispenser brands and accept payment for the fuel dispensed. Responses from the fuel pump and card reader during the fueling process are stored in the RAM, and response data is passed to the computer on request. The flow of data between the microprocessor in the control center and the microprocessor in the computer is controlled by a driver. The driver allows an application software program in the computer to integrate pump control-card reader control with other task the computer may be performing.

Accordingly, the primary object of this invention is to provide a fuel pump-card reader control center for controlling the fueling process and accepting payment of the dispensed fuel through a computer/cash register system.

A further object of the present invention is to provide a fuel pump-card reader control center which can control dispensers with card readers/cash acceptors which are manufactured by different manufacturers.

A further object of this invention is to provide a fuel pump-card reader control center which stores pump and card reader control software in the RAM and is down-loadable from remote locations.

A further object of the present invention is to provide a fuel pump control system which will accept cash for payment of the fuel dispensed.

BRIEF DESCRIPTION OF THE DRAWINGS

Other objects of this invention will appear in the following specification and claims, reference being made to the accompanying drawings which form a part thereof.

DETAILED DESCRIPTION OF THE INVENTION

Figure 1:
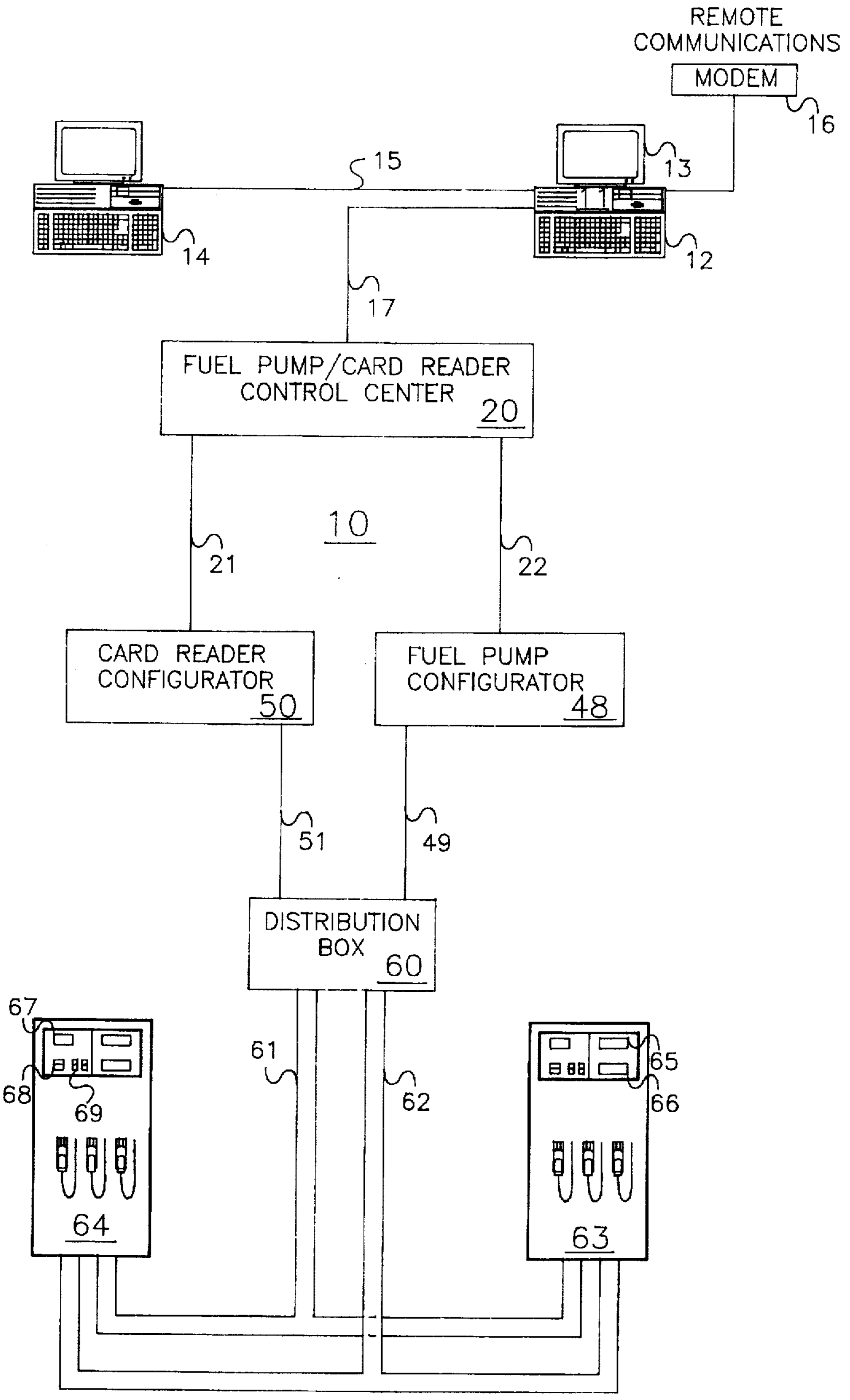
FIG. 1 is a schematic diagram of a fuel delivery facility having fuel dispensers with card readers/cash acceptors functionally connected to computer terminal through the fuel pump-card reader control center.

Referring now to the drawings, and first to FIG. 1, there is shown a schematic overview of a fuel dispensing system including fuel dispensers (63,64) with card readers connected to a computer/cash register system (11) through the fuel pump-card reader control center (20), and fuel pump configurator (48) and the card reader configurator (50). The control center (20) allows the computer (11) to monitor and control the dispensing process at the dispensers (63,64) and accept payment for fuel dispensed when the card reader is used. The fuel pump-card reader control center (20), which is serially connected to the computer (11) through serial cable (17), sends data signals (commands) to the dispensers (63,64) and receives data signals (responses) from the dispensers. The fuel pump configurator (48), connected to the control center (20) through cable (22) and to the distribution box (60) through cable (49), configure the logic signals from the control center (20) into a communication format readable by the fuel pumps in dispensers (63,64). The card reader configurator (50), connected to control center (20) through cable (21) and to the distribution box (60) through cable (51), configure the logic signals from the control center (20) into a communication format readable by the card readers in the dispensers (63,64). The dispensers may be single product, dual product, or multi-product dispensers.

Fuel dispensers are manufactured by several manufacturers including Gilbarco, Tokheim, Wayne Dresser, and others, and widely used in the retail petroleum industry. The operation of dispensers is generally discussed below. A dispenser with a card reader-cash acceptor performs two functions; it controls the fuel dispensing process and it accepts payment for the fuel dispensed when the card reader or cash acceptor is used. A dispenser generally has a pump control component for controlling the dispensing function, and a card reader component for accepting payment for the fuel dispensed. The pump side includes a dollar display (65) for displaying the amount of fuel dispensed, a gallons display (66) for displaying gallons dispensed, and a price per gallon display, not shown, for displaying the price of the fuel. The fuel is pumped from a storage tank through a flow meter out a nozzle, where the flow meter is coupled to a pulser for measuring the amount dispensed and sending a signal to a MP with ROM and RAM; the above constitutes a pump means. The MP in the dispenser communicates with the MP in the control center as later discussed.

The card reader side of the dispenser generally includes a display (67) for prompting the customer, selection key switches (69) for selecting the desired method of payment, a credit/debit card reader (68) for reading cards, a numeric input key switch for entering information such as PINs, a cash acceptor for accepting bills, and a printer for printing a receipt of fuel dispensed. There is a MP with ROM and RAM for controlling the card reading function. The above constitutes a card reader means.

In the illustration, communication data wire pairs (61,62) run from the pump distribution box (60) to the dispenser (63,64) and back to the distribution box (60). A distribution box is a wire connection box where all wires in the dispenser communication network have a common connection. Distribution boxes are manufactured by dispenser manufacturers, and widely used in the industry. The illustration shows a wiring example where the dispensers-controller are communicating in current loop communication. Data wire pair (62) controls the fuel pump function and data wire pair (61) controls the card reader function. The control center (20) sends data signals (commands) to the dispenser (63,64) for controlling the dispensing process, and the dispensers send data signals (responses) to the control center. The control center (20) also sends command signals to the card reader and the reader sends responses to the control center. Information send to the dispenser (63,64) includes price per gallon to be charged for the fuel at corresponding pumps, preset limits for fuel to be dispensed, and pump authorization. Simultaneously, signals are generated at the dispenser for presentation to the control center including pump number, pump status, and dispensed fuel volume and value for the pump.

Dispenser manufacturers use different wiring arrangements and a proprietary communication protocol for communication between their dispensers and controller. A wiring example for current loop communication is shown in FIG. 1. Another type communication format used in the industry for pump control is voltage level. Generally, the communication format between the card readers and the controller is either current loop, RS-232, 422, or 485. Most dispenser manufacturers utilize separate data lines between the controller and fuel pumps, and the controller and card readers. While the illustrative example shows separate data lines, it is understood that the same data line can be used between the controller and fuel pumps and card readers to control both, for example, current loop can be used to control both in the same data line. A feature of the present invention is that it can control various dispenser brands by using configuration circuits (48,50) to translate command and response signals between the dispensers (63,64) and the control center (20).

The use of Point-of-Sales (POS) systems to control fuel dispensers is now being more widely used in the industry replacing the older method of dispenser control through a console, which is a separate device from the register. These systems generally utilize an open architectural hardware platform which includes a PC with POS application software programming to integrate functions including cash register, dispenser control, credit card processing, and scanning. The present disclosure provides a method for controlling different fuel dispenser brands with a computer/cash register having the same application software program.

Data exchange between a computer and a peripheral device can be in a serial fashion using a standard interface format including RS-232, 422, and 485 format. In addition, computers typically include an expansion bus and card connectors allowing peripheral device to directly interface with the computer utilizing direct memory access. The control center (20) operates like any other peripheral device to the computer (11) with an external version having serial connection and an internal version with bus connection, with modifications at the bus as later discussed. Commands can be issued and data read using conventional operating systems including DOS, Windows, UNIX, and others. A DOS TSR driver, as an illustrative example, is later discussed for controlling the flow of data between the two.

Commercially available c-store application software has been developed utilizing computers, for example, Applied Business Corporation located in Atlantic Ga. Generally, these systems include a processing unit with ROM and RAM which is used in combination with an input keyboard (13), monitor (14), and the register application software, constituting a computer (cash register) means. The flow of data is through an I/O port or expansion slot controlled by a driver. It is often desirable to have one or more additional terminals (14) in the store as shown in FIG. 1. For best results these are interfaced through a LAN (15) although it is possible to connect two terminals to the control center (20). A modem interface (16) allows one to down-load control software to the computer (11) for transfer to the control center (20).

The customer starts the fueling transaction by selecting the method of payment by which he wishes to pay for the fuel by pushing one of the input selection keys (69) on the dispenser. Generally, there is an input key for: credit at the dispenser, credit inside, cash at the dispenser, and cash inside. If other information such as a personal identification number is requested, this is entered into a numeric key pad. If the customer selects credit or debit at the dispenser, he inserts his card into card reader. The card number is read in a conventional manner, stored in a queue, and then sent to the computer (11) by the control center (20). The card number is checked for validation, and the dispenser thereafter authorized to dispense fuel. When cash at the dispenser is selected, the appropriate bill is inserted in the cash acceptor, and that amount of fuel is dispensed. If a receipt is requested, the appropriated input key is pressed and a receipt is printed by printer. When credit inside or cash inside is selected, the attendant in the store receives a signal that a customer wants this service and he authorizes the pump by pushing a key on the computer (11) input terminal.

Controller Hardware

Figure 2:
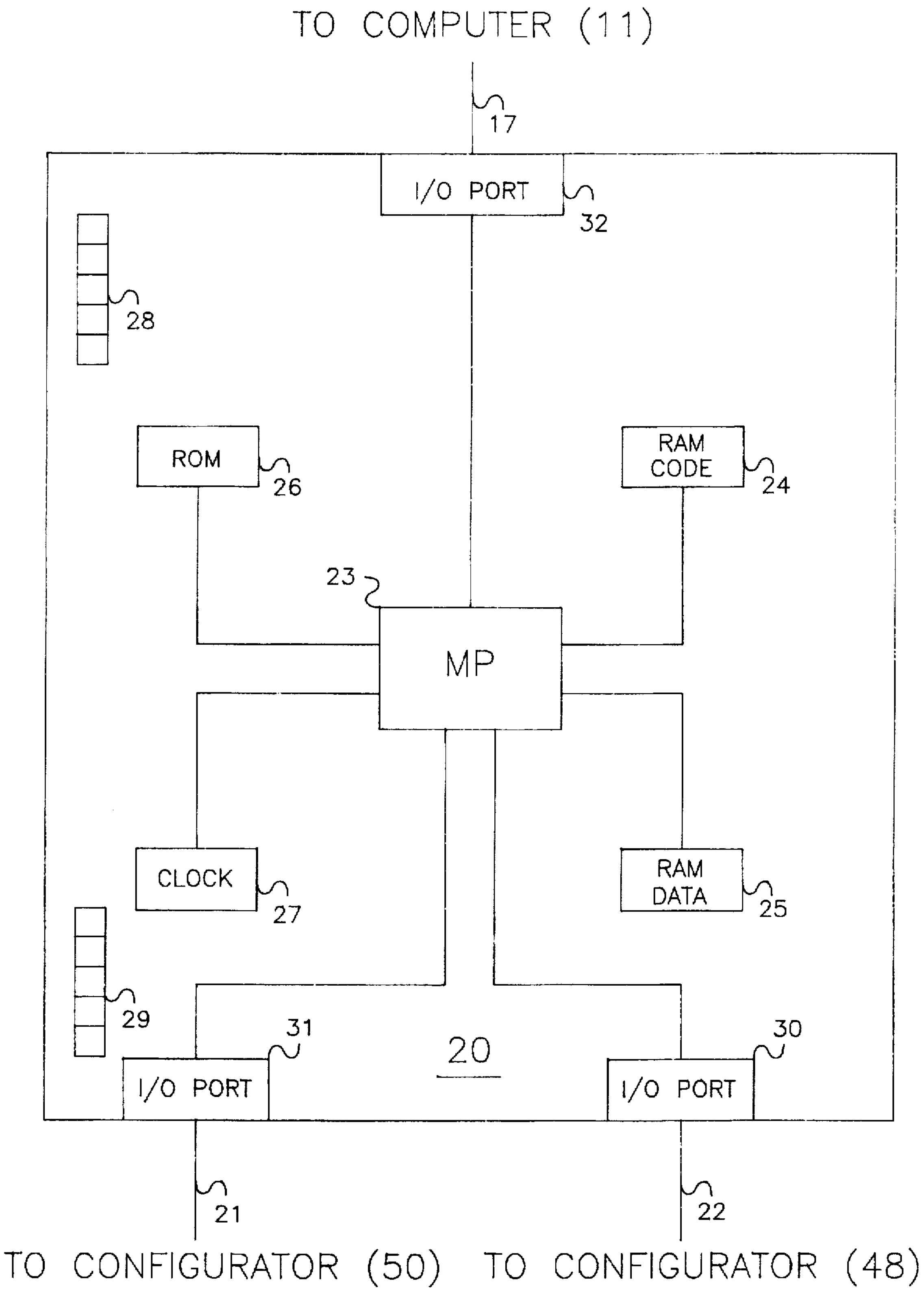
FIG. 2 is a block diagram of the functional components of the fuel pump-card reader control center with serial connection to the computer.

Referring now to FIG. 2, there is shown a block diagram of the fuel pump-card reader control center (20). The system functions as a control interface for processing commands to the pumps and card readers, and receiving responses from these. The control center includes a MP (23), a first RAM (24) means for storing operating code, a second RAM (25) means for temporarily storing commands and received response data, a ROM (26) for storing operating routines, an I/O port (32) for connecting to the computer (11), an I/O port (30) for connecting to the fuel pump configurator (48), an I/O port (31) for connecting to card reader configurator (50), and a baud clock (27) for timing communication, the above constituting a fuel pump-card reader control means. Zilog Z-182 is an example of a MP which can be used in the control center. The control center has a number of diagnostic features built-in. The LEDs (28) indicate communication conditions between the control center (20) and the computer (11); the LEDs (29) indicate communication conditions between the control center and the configurators (48,50). An I/O port can typically handle up to 16 fueling positions and 16 card readers. While not shown on the illustration, there are additional ports for handling the second bank of fueling positions 17–32 and card readers 17–32 in field units.

Figure 3:
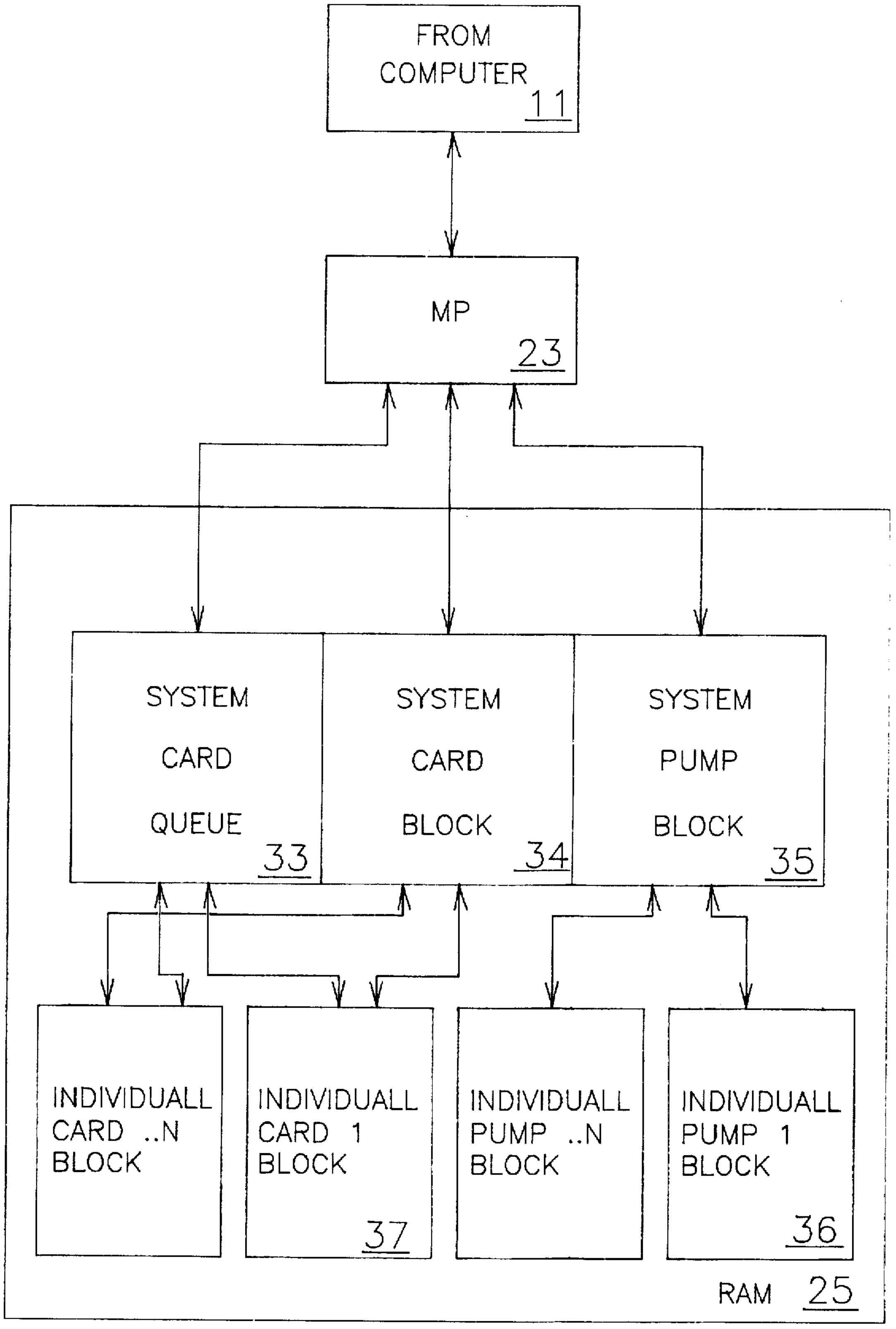
FIG. 3 is a block diagram illustrating the memory blocks in the read-only-memory chip.

The first RAM (24), a nonvolatile Dallas Smart Socket being an example, stores operating code for controlling the fuel pumps and the card readers. The control software, later discussed, can be down-loaded from magnetic medium or remotely through a modem interface. The operating code is stored unchanged in RAM (24) until it is updated by a down-load. During operation, a second (static) RAM (25) temporarily stores commands and response data to the commands for the MP (23). Referring to FIG. 3, there is shown a schematic diagram illustrating how the memory in RAM (25) is sub-sectioned into blocks to provide overall faster operation of the total system. There is a system pump block (35), a system card block (34), and a system card queue block (33). Certain commands are initiated from the computer (11) causing certain events to occur at the dispensers and the dispensers to respond with response data. This information is temporarily stored in the system block (33–35) sections. For example, information stored in the system pump block includes pump commands such as pump prices, status, authorize, sale information, pump stop and resume, and flags indicating communication down. Likewise, there are commands to the card readers such as reader status which is temporarily stored in the system card block (34), and queue control commands including key queue, card queue, cash queue, cash queue, and print queue, which are temporarily stored in the system card queue block (33). The system blocks handle this information for all of the pumps and readers in the system. The system blocks are further sub-sectioned into individual pump blocks (36), where there is a block for each for each fueling position in the fuel delivery system, and into individual card blocks (37), where there is a block for each reader in the fuel delivery system. Information (commands, responses) temporary stored in the pump block (36) for an individual fueling position includes prices, blend ratios, dispenser totals, pump status, current volume and dollar amounts. Information stored in the individual card blocks (37) includes reader status, key queues, card queues, cash queues, and display queues. The nonvolatile RAM (24) and the static RAM (25) constitute a RAM means.

Figure 4:
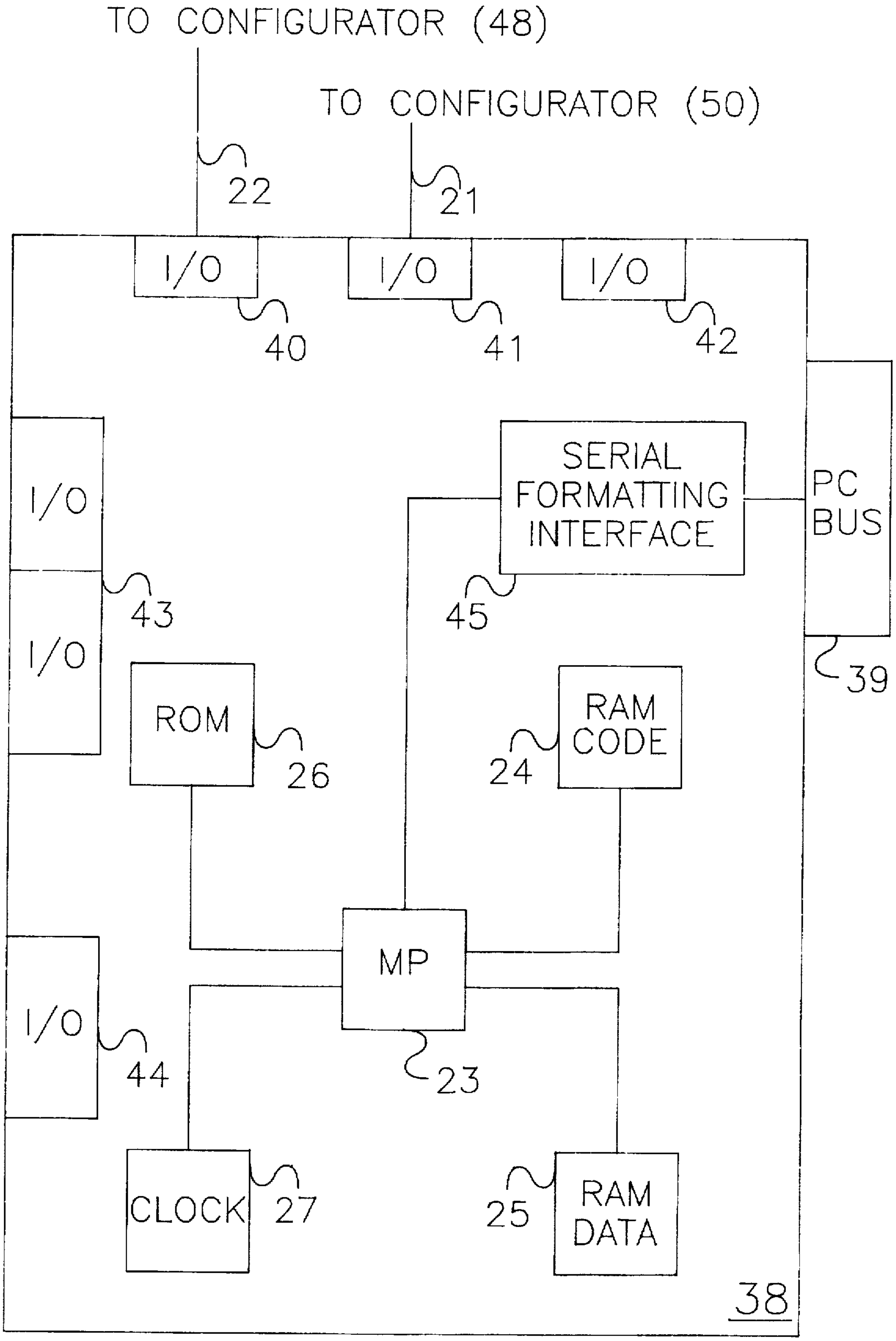
FIG. 4 is a block diagram of the functional components of the internal version of the fuel pump-card reader control center with bus connection to the computer.

The first embodiment of the invention, as seen in FIG. 2, has a serial connection to the computer/cash register (11), and is referred to as an external version. As now seen in FIG. 4, the second embodiment resides in a card connector has a bus connection (39) to the computer (11). This version is referred to as the internal version. The external and internal versions utilize common MP (23), ROM (26) chips, RAM (24,25) chips, but the internal version has a different layout on the circuit board. Input/output port (40) connects to the pump configurator (48), and the I/O port (41) connects to the card reader configurator (50). When there are more the sixteen fueling positions at the site, a second pump and card reader configurator are connected through I/O port (43). The internal version has a additional RS-232 I/O port which can communicate with other devices in RS-232 format. For example, a stand alone card reader could be included in the fuel delivery system by connecting through I/O port (44). There is also a diagnosis I/O port (42) which can be used to access both code and data in the control board.

While the internal version (38) of the control center resides in a card slot in the computer (11), it does not utilize a typical direct memory access; the control center (38) and the computer (11) do not have a shared memory source for passing information. Rather, there is a serial formatting interface (45) circuit in the control center which formats the communication into a format which mimics a serial format. Data is sent from the MP in the computer (11) through PC bus (39) and serial formatting interface (45) to MP (33) in the control center bit by bit, and data is returned in the reverse order. Zilog Z-80/182 is an example of a MP with this capability. In essence, the communication format in the internal version mimics the serial communication in the external version. This communication channel is used to send data to the control center, receive data from the control center, and to down-load code to the control center. There are advantages to this; it allows one to use the same drivers for both versions, and it does not place limitations on the type computer one can use in the fuel delivery system.

A feature of the fuel pump-card reader control center (20) is that it has the ability to control different dispenser brands, each having its own unique communication protocol. This is accomplished by a fuel pump configurator (48) and a card reader configurator (50) which are, in essence, protocol translators. Electronic dispensers with in-pump-card reading capability have a MP with memory devices for controlling the dispensing process and another MP with memory in the card reader for controlling the card reading function. Certain dispenser brands use current loop communication, while others use voltage level communication for pump control; current loop, RS-232, 422, and 485 are most often used for card reader control. The configuration circuits (48,50) are, in effect, circuits for translating communication protocols, thereby providing a method for controlling the pumps and card readers in accordance with dispenser protocol. For example, with dispensers using current level communication, it is a current translator; with dispensers using voltage level communication, it is a voltage translator.

Figure 5:
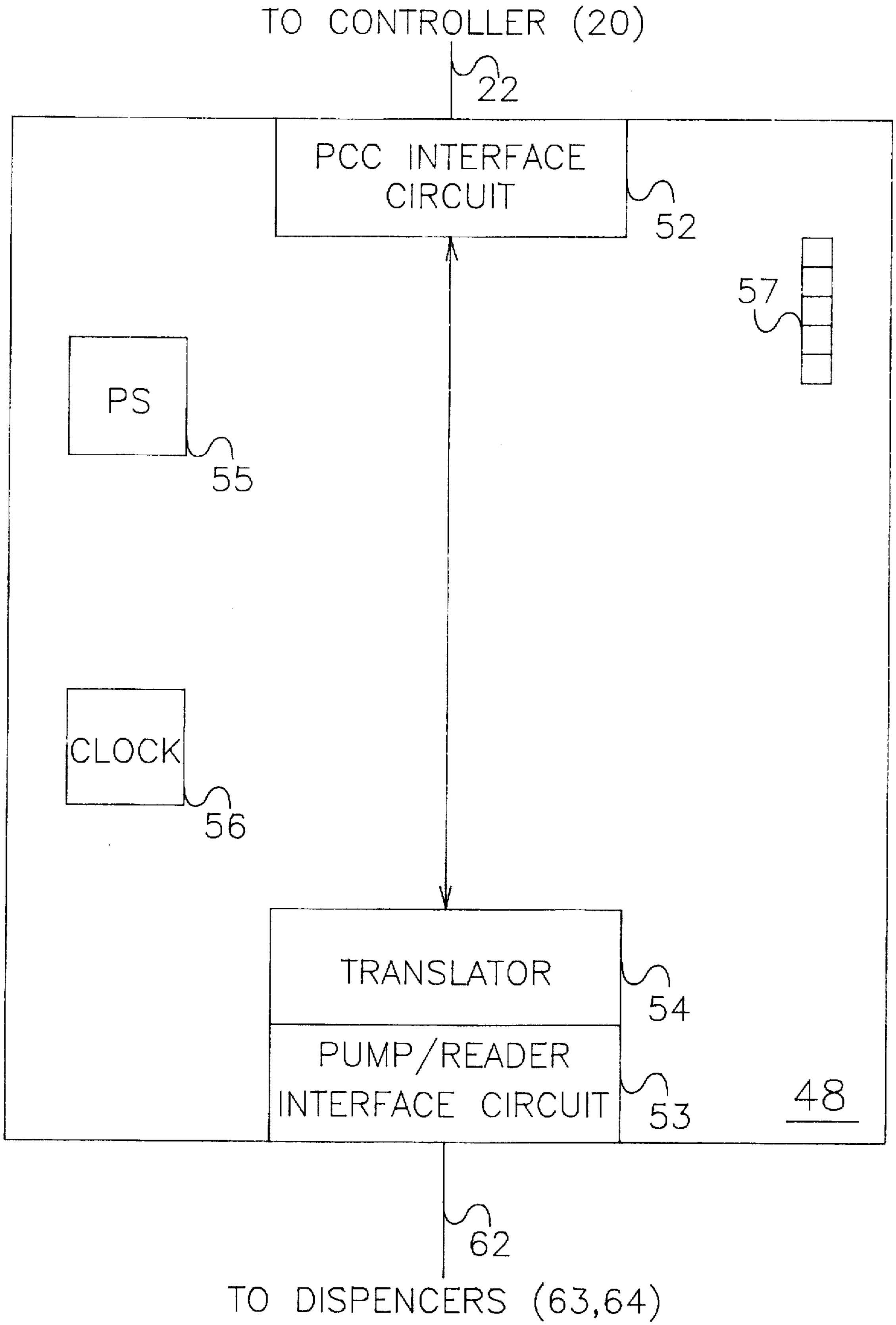
FIG. 5 is a block diagram showing the functional components of a configurator for configuring communication protocols between the control center and the dispensers.

There is shown in FIG. 5 a block diagram of a configuration circuit (48) which includes an PCC interface circuit (52) for receiving computer logic signals from the MP (23) in the control center (20), a translator circuit (54) for configuring the logic signals into digital data signals for controlling the dispensers (63,64) and configuring the responses from the dispensers into logic signals, and a pump-reader interface circuit (53) for connection to the dispensers. If the dispensers and the dispenser controller are communicating in current level, the translator (54) includes an opto-coupler with light emitting diode and transistor, commercially available, for generating a current level signal. If the dispensers and controller are communicating in voltage level, the translator (54) includes a comparator (for example LM 393) for configuring the logic signals into voltage level signal. There is a baud rate chip (56) for synchronizing communication to the MP (23) in the controller (20). The configuration circuit (48) includes a power supply (55) for converting AC to DC including a low voltage regulator providing a constant current or voltage. For example, in a current loop system it provides a constant 45 milli-amps. The PCC interface circuit (52), the translator circuit (54), the pump-reader interface circuit (53), and the power supply (55) constitute a fuel pump configuration means.

The configurator also has a series of LEDs (57)on the board for indicating communication status. In the illustration, the configuration circuits are shown as a separate components from the control board, where they communicate through an opto-coupler arrangement. However, it is understood that the configuration circuits could be included as an integral part of the control center board (20). The reason for the separation is that it helps prevent large electrical surges from getting into the control center and computer during a lighting strike. The configurator absorbs the damage, In addition, the opto-couplers electrically isolate the two helping to keep electrical noise out of the control center. The power to drive the opto-couplers comes from the configurator side providing additional protection.

The configurator between the control center (20) and the card reader in the dispensers (63,64) utilize the same PCC interface circuit (52), pump-card reader interface circuit (53), power supply (55), and clock (56). If the controller and reader are communicating in current loop, the translator (54) includes an opto-coupler, if they are communicating in RS-232, 422, or 485, the appropriate chip for formatting is included. The above constitutes a second configurator means.

Controller Software

Following is an example protocol used to communicate with the pump-card reader control center (20). The protocol may be used to control up to 99 fueling positions with 8 hoses per position. Generally, the commands are initiated from the transaction board (12) on the computer (11). The commands can be stored in ROM or RAM, but in the preferred embodiment in the RAM (24) so that the control commands are down-loadable from remote locations.

The command format is as follows, where the check digit is constructed by adding all the characters of the string, starting with the STX and ending with the ETX, then subtracting the value from "00" and sending the result:

STX CMD [Pump] [Hose] [. . . . Data . . . . ] ETX CD

STX=ASCII 02/16

CM=Command Code (one character)

Pump=Fueling position (two characters)

Hose=Grade Number (one character)

Data=Programming Data or Action

ETX=ASCII 03/16

CD=Check Digit

The AUTHORIZATION COMMAND 'A' is used to start a fueling operation. A limit can be set to a dollar, volume amount or no limit (fill-up). The command is as follows:

Command Format:

STX A Pump# Hose# Flag$$$$.$$ VVV.VVV ETX CD

A=Command code
Pump#=Fueling Number (2 characters)
Hose#=Hose Number (1 character)
Flag=Type of Authorization
$$$$$.$$=Dollar Limit Amount
VVV.VVV=Volume Limit Amount Flag Operation:

'0'=Dollar Limit (credit price)

'1'=Dollar Limit (cash price)

'2'=Volume Limit (credit price

'3'=Volume Limit (cash price)

'4'=Fill-up

Response:

ACK/NAK only

The SALE INFORMATION COMMAND 'B ' is used to read the sale information or clear the Sale Ready flag. The information in the response, once the sale is complete, is what actually took place at the fueling position.

Command Format:

STX B Pump# Flag ETD CD

B=Command Code
Pump#=Fueling position
Flag=Type of Operation
Flag Operation
R=Read Sale Information
C=Clear Sale Ready Status
E=Extended Sale Information Extended Sale Command Format:

STX B Pump# E Tags(s) ETX CD

H=Hose Number
M=MOP -method of payment- of sale
$=Dollar Amount of Sale
V=Volume of Sale
P=Unit Price of Sale
S=Current Pump Status
T=Pump Poll Totals
Volume—0000000.000

Card—00000000.00

Cash—00000000.00

Response:

Read Operation

STX Pump# Flay$$$$.$$ VVV.VVV ETX CD

Pump#=Fueling Position

Hose#=Hose Number

Flag=Type of Sale $$$$.$$=Dollar Amount

VVV.VVV=Volume Amount

Flag Indicator:

'0'=Credit Sale

'1'=Cash Sale

Clear Operation:

ACK/NAK only

Extended Sale Operation:

When a sale command is issued with an E tag it is treated as an Extended Sale Command and will return data in the following format:

STX Pump# Tag1 Data1 . . . Tag Data ETX CD

The STOP COMMAND 'C' is used to stop one or all fueling positions, and is as follows:

Command Format:

STX C Pump# ETX

C=Command Code

Pump=Fueling Position

Response:

ACK/NAK only

The RESUME COMMAND 'D' is used to resume one or all fueling positions, and is a follows:

Command Format:

STX D Pump# ETX

D=Command Code

Pump#=Fueling position

Response:

ACK/NAK

The ERROR COMMAND 'E' is used to read the errors queued. These errors may be related to the pumps or to the system.

Command Format:

STX E Flag ETX CD

E=Command Code

Flag=Operation Type

Flag Operation:

R=Read the Error

W=Clear the Top Error

C=Flush the Error Queue

E=Extended Error Read

Response:

Clear/flush operation

ACK/NAK only

Read Operation

STX Pump# EC ETX CD

Pump#=Fueling Position

EC=Error Type

Extended Read Operation

STX Pump# EC EX ETX CD

Pump#=Fueling Position

EC=Error Type

EX=Extended Error Code

Error Codes:

System Codes

01=Check Sum or PROM Failed

02=Byte Test of RAM Failed

03=Reserved

04=All Pump Communication Down

05=Invalid Command Received

06=Authorization Failed

07–9=Reserved

10=System Reset

Pump Codes

01=Unit Price on Pump Incorrect

02=Pump did not stop at Preset

03=Invalid Data received from Pump

04=Communication down for this Pump

05=Invalid Pump Staus

06–8=Reserved

09=Pump authorized by itself

Reader Codes System

50=Reader Command Error

51=Card Queue overflow Error

52=Cash Queue overflow Error

53=Key Queue overflow Error

54=Display Queue overflow Error

60=Print Queue overflow Error

61=Print Command Error

70=Numeric Mode Error

Reader Specific Codes

20=Key configure Queue Entry Error

21=Print Queue entry Error

Pump Operation Codes

70=Emergency off Operation

71=All Resume

73=Status request Operation

80=Pump stop Operation

81=Pump resume Operation

82=Pump totals Operation

83=Authorization Operation

85=Sales data request Operation

85=PPG Operation

86=Unauthorized Pump armed Condition

The STATUS REQUEST COMMAND 'F' is used to read the status of each pump.

Command Format:

STX F [E] STX CD

Response:

STX Ss Pp Pp . . . Pp ETX CD

System Status:

S=Bit 3=Reserved

=Bit 2=Reserved

=Bit 1=Card Reader Status changed

=Bit 0=Communication down for all Pumps s=Bit 3=Error in the Queue

=Bit 2=Controller has completed a reset

=Bit 1=Reserved

=Bit 0=Emergency stop sent to pumps

Pump Status:

P=Bit 3=Pump has been sent a Stop

=Bit 2=Drive away

=Bit 1=Pump is dispensing Fuel

=Bit 0=Sale is complete and ready to read p=Bit 3=Controller allowed to authorize a Pump =Bit 2=Authorization sent to pump =Bit 1=Pump logged on =Bit 0=A Pump Handle is lifted and request service The RESET COMMAND 'G' is used to reset the controller.

Command Format:

STX G ETX CD

Response:

ACK/NAK only

The BLEND COMMAND 'H' is used to set the blend ratio in the pumps that allow the controller to adjust the gasoline grade ratio.

Command Format:

STX H Pump# Hose# XXX ETX CD

Pump#=Fueling Position

Hose#=Hose Number

XXX=Percent of Hose #1 Ratio

Response:

ACK/NAK

The PUMP TOTALS COMMAND 'I' is used to read the totals from the requested fueling position and hose number.

Command Format:

STX I Pump# Hose# ETX CD

Pump#=Fueling Position

Hose#=Hose Number

Response:

STX Pump# Hose# Flag VVVVVVV.VV XXXXXXXX.XX YYYYYYYY.YY ETX CD

Pump#=Fueling Position

Hose#=Hose Number

Flag=Totals Type

VVVVVVV.VVV=Volume Totals

XXXXXXXX.XX=Credit Totals

YYYYYYYY.YY=Cash Totals

Flag Operations:

'0'=Totals not available for ths Pump

'1'=Pump busy, try later

'2'=Money Totals only

'3'=Cash & Credit Totals

The PPU COMMAND 'J' is used to read or set the price per unit on the fueling position.

Command Format:

STX J Pump# Hose# Flag XXX.XXX YYY.YYY ETX CD

Pump#=Fueling Position

Hose#=Hose Number

Flag=Operation Type

XXX.XXX=Credit Price

YYY.YYY=Cash Price

Operation Flag:

R=Read Operation

W=Write Operation

Response:

Write Operation

ACK/NAK

Read Operation

STX Pump# Hose# XXX.XXX YYY.YYY ETX CD

Pump#=Pump Number

Hose#=Hose Number

XXX.XXX=Credit Price

YYY.YYY=Cash Price

The SYSTEM VERSION COMMAND 'K' returns the software versions of the sections of the controller.

Command Format:

STX K ETX CD

Response:

STX Sys Pmp1 Rdr1 Pmp2 Rdr2 ETX CD

Sys=System Version

Pmpx=Pump Version

Rdrx=Reader Version

There is a DOWN-LOAD COMMAND 'L' which is used to down-load pump and card reader control software to accommodate software updates. The down-load command is later discussed in the Down-load Section.

Following is an illustrative example of the communication protocol used in the credit card interface for controlling fuel island card readers. Each reader is activated by sending a keyboard layout, and each reader is sent a printer header and footer message. Commands are passed to and from the reader in "queues." Each queue entry contains enough information to complete the command and is processed in chronological order. The commands are stored in RAM (24) of the dispenser control center (20) and include: keyboard configure command, reader status command, key queue control, card queue control, cash queue control, print queue control, display queue control, and key entry control. Commands are initiated through input keys on the transaction board (12) on the computer/cash register system (11).

As with the commands for controlling pump function, the protocol uses a "2's" compliment check byte. Each command and response data is transferred in a formatted frame starting with a "start of text" (ASCII STX [02]), followed by the command and data or response, followed by the "end of text" (ASCII ETX [03]) and the check byte. All data (except the check byte) are ASCII characters. All commands are one character, the pump number is two characters, the hose number is one character. All commands are "ACKed" (ASCII 06) or "NAKed" (ASCII 15/16), but the responses are not.

Command format:

STX CMD HH [ . . . Data . . . ] ETX CD

STX=ASCII 02/16

CMD=command code (one character)

HH=Reader Number

Data=programming data or action

ETX=ASCII 03/16

CD=check digit

The KEYBOARD CONFIGURE COMMAND 'Z' configure the input selection keys in the card reader and is as follows:

Command Format:

STX Z HH ABCD000000000RSTUVe ETX CD

HH=Reader number

0=NULL e=End of String code

Special Keys

S=Start code

E=Enter code

L=Clear code

B=Backspace code

C=Cancel code

H=Help

D=Debit

N=No

R=Credit

Y=Yes

Response:

ACK/NAK only

The READER STATUS COMMAND 'Y' is used to retrieve the status indicators pertaining to the card reader section of the controller. The first three status bytes indicate the current queue conditions. Following these three bytes is one byte per reader, indicating reader conditions.

Command format:

STX Y Flag ETX CD

Response:

STX S1 S2 S3
RRRRRRRRRRRRRRRRRRRRRRRRRRRR ETX CD

S1=bit 7—don't care
bit 6—1
bit 5—reserved
bit 4—reserved
bit 3—CASH QUEUE FULL
bit 2—CASH QUEUE EMPTY
bit 1—CARD QUEUE FULL
bit 0—CARD QUEUE EMPTY S2=bit 7—don't care
bit 6—1
bit 5—KEY CONFIG QUEUE FULL
bit 4—KEY CONFIG QUEUE EMPTY
bit 3—KEY QUEUE FULL
bit 2—KEY QUEUE EMPTY
bit 1—DISPLAY QUEUE FULL
bit 0—DISPLAY QUEUE EMPTY S3=bit 7—don't care
bit 6—1
bit 5—reserved
bit 4—reserved
bit 3—reserved
bit 2—PRINT ENTRY ACTIVE
bit 1—PRINT QUEUE FULL
bit 0—PRINT QUEUE EMPTY R=reader dependent status
bit 7—don't care
bit 6—1
bit 4 & 5—(Printer Status)
00—No Error
01—Error
10—Paper Out
11 - Paper Low
bit 3—PRINTER IDLE
bit 2—ECHO 0N
bit 1—NUMERIC ENTRY ONLY
bit 0—READER LOGGED The KEY QUEUE CONTROL COMMAND 'X' reads or clears the top entry in the key queue and the command is as follows:

Command format:

STX X Flag ETX CD

Flag Operation:
R=Read Entry
C=Clear Entry

Response:

Clear Operation
ACK/NAK

Read Operation
STX HH kk . . . [NULL] ETX CD
HH=Reader Number
k=Returned key code DES Encryption Response:

STX HH d XxXxXxXxXxXxXxXx [NULL] ETX CD
Xx represents an 8-bit binary value with X as the upper nibble and x as the lower nibble.

The CARD QUEUE CONTROL COMMAND 'W' reads or clears the entries in the card queue and the command is as follows:

Command Format:

STX W Flag ETX CD

Flag Operation:
R=Read Entry
C=Clear Entry

Response:

Read Operation
STX HH track 1 [NULL] track 2 [NULL] ETX CD
HH=Reader number (2 ASCII digits)
track 1=Track 1 data terminated
track 2=Track 2 data terminated Clear Operation
ACK/NAK only The CASH QUEUE CONTROL COMMAND 'V' reads or clears entries in the cash queue and is as follows.

Command Format:

STX V Flag ETX CD

Flag Operation:
Read Entry
C=Clear Entry

Response:

Read Operation
STX HH $$$$.$$ ETX CD
HH=Reader number
$$$$.$$=Cash amount

Clear Operation
ACK/NAK

The PRINT QUEUE CONTROL COMMAND 'U' sends a print job to the printer through a queue. Each print job is tagged with the reader number and message type.

Print Job Types:
H=Header
F=Footer
R=Receipt

String Flags:
OO=First data string
nn=Subsequent data strings
FF=Ending string

Data Strings:

Command
STX U nn'sss..sss' [NULL] dd ETX CD
nn=String number
ss=Print data
dd=Next string number Response:
ACK/NAK only Ending String:

Command:
STX U FF hh t ETX CD
FF=Ending flag
hh=Reader number
t=Print job type

Response:
ACK/NAK only

The DISPLAY QUEUE CONTROL COMMAND 'T' sends data to the display.

Command:
STX T HH ° sss..sss;[NULL]ETX CD
HH=Reader number
ss=Display data

Response:
ACK/NAK only

The KEY ENTRY CONTROL COMMAND 'S' activates the keyboard and specifies the type keyboard input allowed. The entry can be any key, numeric with echo, or numeric without echo.

Command:

STX S HH n e d ETX CD

HH=Reader Number
=N(normal) or #(numeric
=e(echo on) or n(echo off)
d=d(DES on) or n(DES off)

Response:

ACK/NAK only

The PRELOADABLE MESSAGE COMMAND 'R' sends messages used for "Print Receipt" and "Card Swipe" functions. These can be hard-coded or programmable.

Command Format:

STX R HH d n 'sssss. . . ss' [NULL] ETX CD

HH=Reader Number
d=Printer or Card Display or Miscellaneous
n=Display Message Number
ss=Display Data Examples of hard-coded messages:

Print Default Messages:

1 Printing Receipt
2 Receipt Complete
3 Please Take Receipt
4 Printer Error

Card Default Messages:

1 Remove Card Quickly
2 Insert Card Again
3 Invalid Card
4 One moment Please
5 Card Inserted Wrong Response:

ACK/NAK

The BEEPER CONTROL command Q activates the beeper for the specified number of beeps.

Command Format:

STX Q HH cc ETX CD

HH=Reader Number
cc=Number of Beeps to Sound

Figure 6:
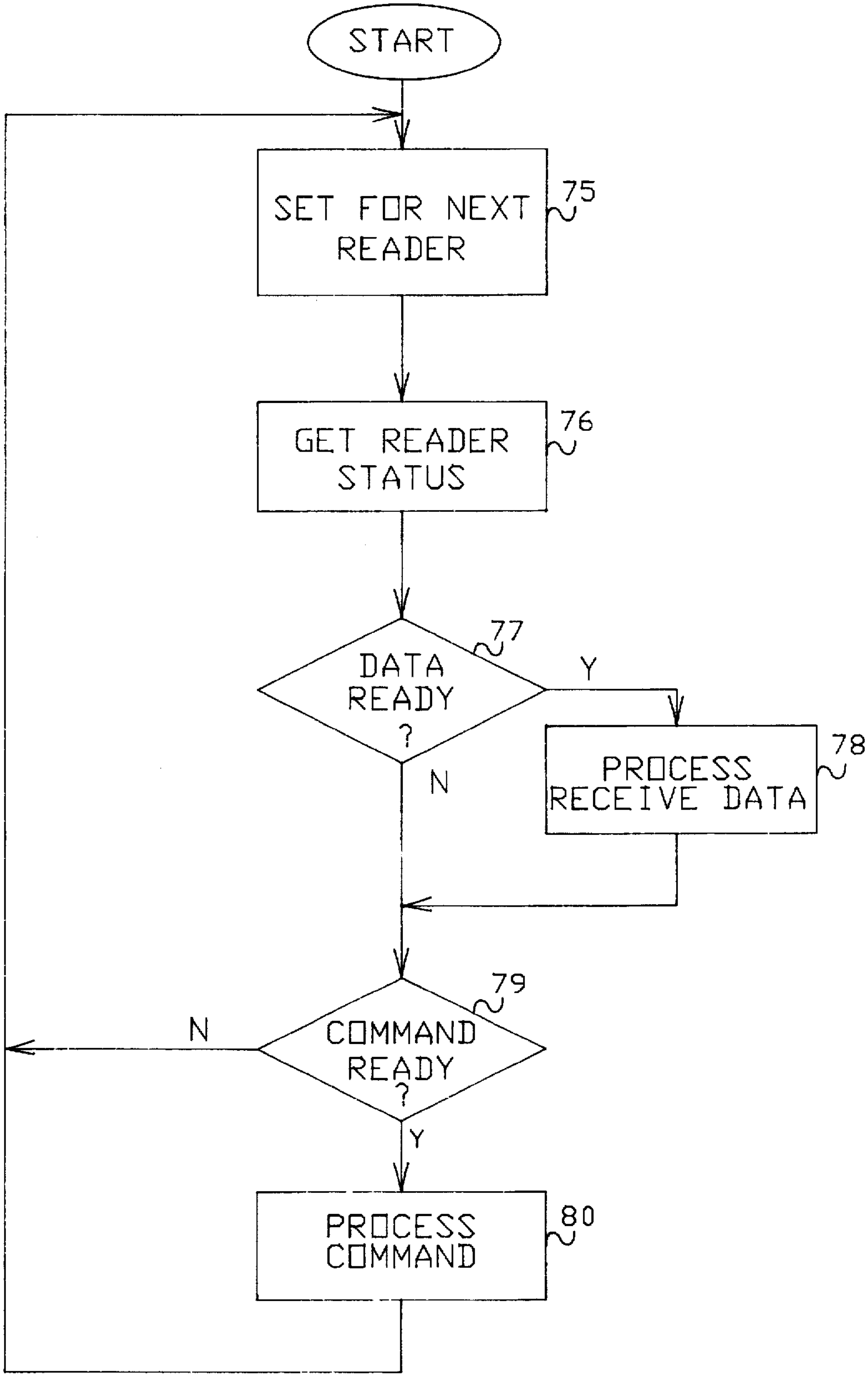
FIG. 6 is a program flow chart for the execution of a command for reading the card reader and processing the receive data.

Referring now to FIG. 6, there is shown a flow chart for processing the card reader commands by MP (23) stored in the RAM (24). The dispensers are constantly polled by the MP (23) in the fuel pump-card reader control center (20) to determine status in both the pump component and card reader component. With dispensers having card readers/cash acceptors, a request for service at a dispenser is initiated by the customer pressing a selection key (69), which may include cash inside, cash in the acceptor, credit inside, or credit at the dispenser. As previously discussed, the commands read or clear the queues. The MP sets for the next reader (75), where the readers are addressed by reader number, and gets the reader status (76). A decision is made at the decision block (77) to determine if data is ready; if positive, it processes receive data (78), if negative, it refers to decision block (79). A positive condition in decision block (79) causes the command to be processed (80), a negative condition in decision block (79) causes an exit from the loop wherein it sets for the next reader.

As previously discussed, computers used in POS system can integrate several functions including cash register, credit card processing, scanning, inventory control, through auxiliary software programs. The fuel pump-card reader control center (20) acts as a peripheral device, thereby freeing up the computer (11) to perform other task. There is no shared memory between the computer and control center. A driver controls the flow of data between the two. Reference is made to the recited related application for an illustrative an example of a MS/DOS driver for the dispenser control system (20) and the POS computer (11). It is understood that the DOS driver is illustrative only, other operating systems can be used including Windows, Unix, and 0S-2. The control center is not format specific for any computer type. The illustrative driver is a terminate-stay-resident (TSR) program for controlling the flow of data to and from the control center. The TSR is accessed through a DOS "interrupt" with the AH register containing the function number and the DS:DX segment register. The register contains the buffer address of the data to or from the driver. The TSR driver makes use of two DOS interrupts; one interrupt accesses the driver, the other interrupt links the "Timer-Tick" for time out operations.

Figure 7:
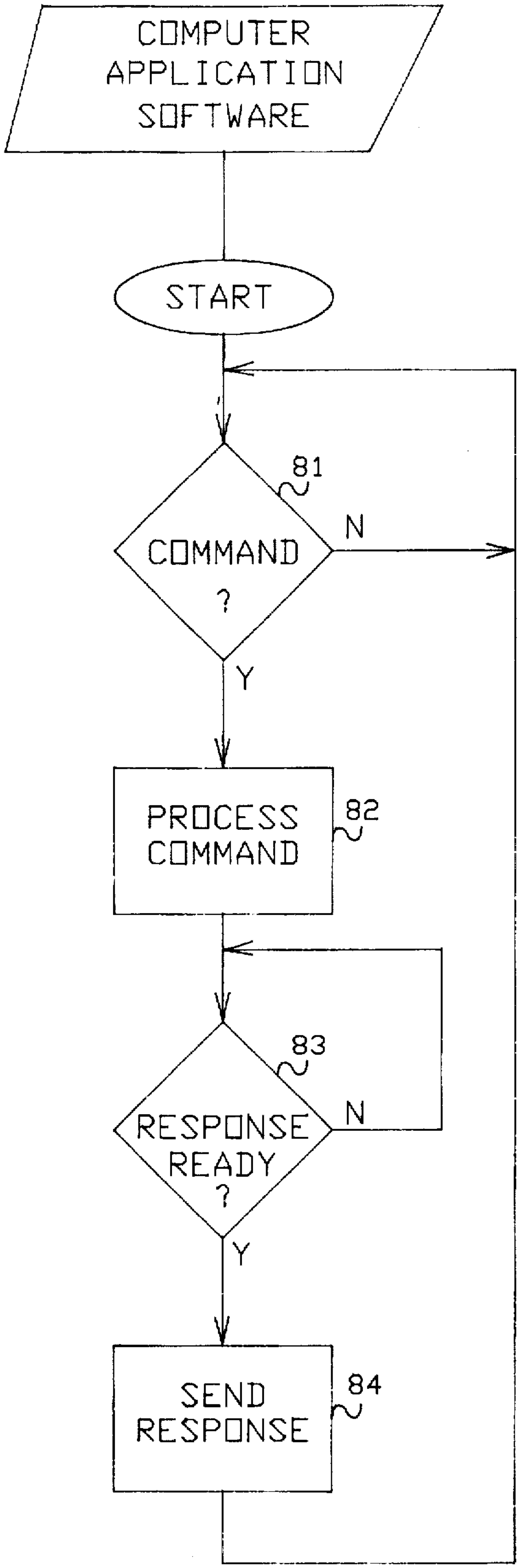
FIG. 7 is a program flow chart illustrating the interface between the control center and the POS application software in a computer.

Several previously discussed commands are initiated from the computer (11) to the control center (20). Referring now to FIG. 7, there is shown a program flow chart of command flow. Take for example the sale information command which is used to read sale information or clear the sale ready flag. The command can be used at any time during a sale in progress. The information in the response, once the sale is complete, is what took place at the fueling position. The computer is constantly polled through command decision block (81). In the present example, it is for sale information, and the command is processed (82) when present. The response ready decision block (83) determines when the response is ready, and the response (81) is sent to the computer.

Down-loading Code

Figure 8:
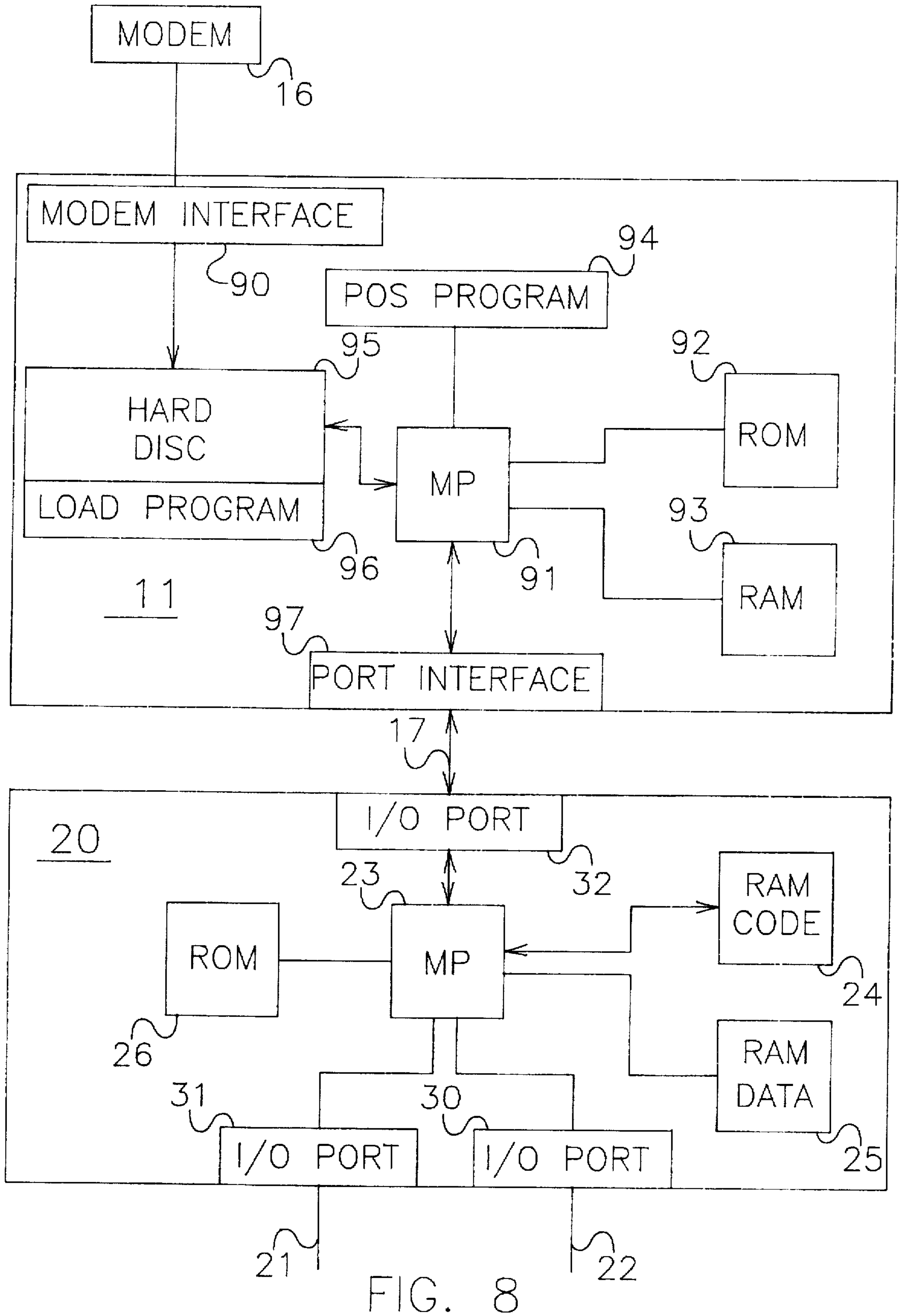
FIG. 8 is a block diagram of the present invention connected to a computer for down-loading code.

The present invention allows updates of the operating code for the control center (20) to be down-loaded from the computer (11). If there is a technician in the field, down-loads can be from magnetic medium. If no technicians are on site, down-loads can be through a modem interface over phone lines. The advantage is that technicians do not have to visit the site for code upgrades. Referring to FIG. 8, there is shown a block diagram of a computer (11) connected to the control center (20). The computer typically includes a MP (91), ROM (92), RAM (93), and hard disc drive (95), with a POS application program for integrating cash register function, dispenser control, card processing, scanning, and other modules. Associated with the hard drive (95) is a modem interface for receiving data and a load program (96) for transmitting the data after storage.

During a down-load, the code is transferred from the hard disc (95) by MP (91) through port interface (97) and I/O port (32) to MP (23) which stores the code in nonvolatile RAM (24); the down-load is executed by load program (96). The MP (91) in computer (11) first issues a down-load command, and waits for an all-ready signal from the controller. The all-ready signal is sent after the controller shuts down the system and removes old code to be replaced from memory. The code is transferred by code record until the last record is received, after which the controller is restarted. The above constitutes a down-load communication means. With the external controller version, transfer is through serial cable (17); with the internal controller version, down-load is through the previously discussed serial formatting interface (45).

The present invention may, of coarse, be carried out in ways other than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A fuel delivery system, comprising:

(a) a plurality of fuel dispensers having a fuel pump means for delivering a variable volumetric flow of fuel into a vehicle tank and a card reader means for accepting payment for the fuel dispensed;

(b) a computer means, functionally connected to said fuel dispensers, for initiating commands to said fuel dispensers and for receiving response data from said fuel dispensers;

(c) a fuel pump-card reader control means having a programmable data processor with a read-only-memory means for storing routines for said data processor and a read-and-write-memory means for storing operating code and response data, operatively connected between said fuel dispensers and said computer means, for;

(1) reading an input selection key in said card reader means in said fuel dispensers for determining when a customer wants service and how said customer wants to pay for fuel dispensed;

(2) retrieving commands from said read-and-write-memory means in a predetermined sequence and outputting said commands in a readable format to said pump means and said card reader means in said dispensers causing fuel to be dispensed;

(3) receiving responses from said fuel pump means and said card reader means in said fuel dispensers during the fueling process and storing said responses in said read-and-write-memory means;

(4) retrieving said response data from said read-and write memory means and down-loading to said computer means on request;

(d) a first configuration means electrically connected between said fuel pump-card reader control means and said pump means in said fuel dispensers for configuring said commands into a communication protocol readable by said pump means and said responses into a communication protocol readable by said control means;

(e) a second configuration means connected between said fuel pump-card reader control means and said card reader means in said dispensers for configuring said commands into a communication protocol readable by said card reader means and said responses into a communication protocol readable by said control means; and (f) a down-load communication means for down-loading fuel pump and card reader control software to said read-and-write-memory means in said fuel pump-card reader control means.

2. A fuel delivery system as defined in claim 1 wherein said read-and-write-memory means includes a nonvolatile read-and-write chip for storing operating code and a static read-and-write chip for storing response data.

3. The fuel delivery means as defined in claim 1 wherein said fuel pump-card reader control means has a RS-232 serial connection to said computer means for transmitting and receiving data.

4. The fuel delivery system as defined in claim 1 wherein said fuel pump-card reader control means has a computer bus interface means connecting to said computer means for transmitting and receiving data.

5. A fuel delivery system as defined in claim 1 wherein said first configuration means includes an opto-coupler with light emitting diode and transistor for translating current levels to communicate with said fuel pump means.

6. A fuel delivery system as defined in claim 1 wherein said second configuration means includes an opto-coupler with light emitting diode and transistor for translating current levels to communicate with said card reader means.

7. A fuel delivery system as defined in claim 1 wherein said first configuration means includes a comparator for translating voltage levels to communicate with said fuel pump means.

8. A fuel delivery system as defined in claim 1 wherein said second configuration means includes a RS-232 formatting chip for formatting communication with said card reader means.

9. A fuel delivery system as defined in claim 1 wherein said second configuration means includes a RS-422 formatting chip for formatting communication with said card reader means.

10. The fuel delivery system as defined in claim 1 wherein said second configuration means includes a RS-485 formatting chip for formatting communication with said card reader means.

11. A fuel pump-card reader control center for controlling a fuel delivery system, used in combination with at least one fuel dispenser having a fuel pump means with a first programmable memory device for dispensing fuel, a card reader means with a second programmable memory device for accepting payment for fuel dispensed, and a computer means with a third programmable memory device including application software programming for performing cash register operations, comprising:

(a) a fuel pump-card reader control means including a printed circuit board with a read-only-memory means for storing operating routines and a read-and-write-memory means for storing a series of commands to control said fuel dispenser and responses from said dispenser during the fueling process, and a dispenser control processor, operatively connected to said first and second programmable memory devices in said dispenser and to said third programmable memory device in said computer means, for (1) reading said second programmable memory device in said card reader means to determine the presence of a customer at said dispenser and how said customer intends to pay for dispensed fuel;

(2) retrieving said commands from said read-and-write-memory means in a predetermined sequence and outputting said commands in a readable format to said first programmable memory device in said pump means in said dispenser causing said dispenser to dispense fuel;

(3) receiving response data from said first programmable memory device during the fueling process and storing said response data in said read-and-write-memory means;

(4) processing and outputting said response data to said third programmable memory device in said computer means through a driver interface program to control the flow of data between the two;

(b) a first configuration means functionally connected between said fuel dispenser control processor and said first programmable memory device in said pump means in said dispenser for translating the communication protocols of the two wherein said commands are readable by said first programmable memory device and said responses are readable by said dispenser control processor;

(c) a second configuration means functionally connected between said dispenser control processor and said second programmable memory device in said card reader in said dispenser for translating the communication protocols of the two wherein said commands are readable by said second programmable memory device and said responses are readable by said dispenser control processor;

(d) A down-load communication means for down-loading fuel pump and card reader control software to said read-and-write-means in said dispenser control processor.

12. A fuel pump-card reader control center as defined in claim 11 wherein said fuel pump-card reader control means resides in a card connector in an expansion bus in said computer means with said third programmable memory device and communicates with said computer through a bus interface.

13. A fuel pump-card reader control center as defined in claim 12 wherein said fuel pump-card reader control means further includes a serial formatting interface means for formatting communication between said control means and said computer means into a serial format for communication with said computer through said bus interface.

14. A fuel pump-card reader control center as defined in claim 11 wherein said fuel pump-card reader control means includes a RS-232 formatting chip for formatting the communication between said control means and said computer means with said third programmable memory device into RS-232 format.

15. A fuel pump-card reader control center as defined in claim 11 wherein said read-and-write-memory means in said fuel pump-card reader control means includes a nonvolatile read-and-write chip for storing said commands and a static read-and-write chip for storing said response data.

16. A fuel pump-card reader control center as defined in claim 15 wherein said static read-and-write chip is subsectioned into blocks including system pump block, system card block, and system card queue block for temporarily storing system pump and reader data.

17. A fuel pump-card reader control center as defined in claim 16 wherein said system pump block is further subsection into individual pump blocks where there is a pump block for each fueling position in the fuel delivery system for temporarily storing data.

18. A fuel pump card reader control center as defined in claim 11 wherein said first configuration means and said fuel pump-card reader control means are functionally connected through an opto-coupler means for communicating between the two.

19. A method for controlling the fuel dispensing process by a fuel pump-card reader control center including a first microprocessor with read-only-memory means for storing operating routines and read-and-write-memory means for storing dispenser control commands and responses to said commands, functionally connected to at least one fuel dispenser having a second microprocessor with programmable memory device for dispensing fuel and a third microprocessor with programmable memory device for controlling a credit card reader, and further functionally connected to a computer means including a forth microprocessor with programmable memory device including an application program for performing cash register function, where said fuel pump-card reader control system utilizes a fuel pump configuration means to configure commands to and responses from said second microprocessor and a card reader configuration means to configure commands to and responses from said third microprocessor, comprising the steps of:

(a) setting the price per unit of the fuel to be dispensed by said dispenser by sending a command configured by said fuel pump configuration means including fueling position, hose number, read or write operation flag, and unit price, whereas with a write operation flag the price is stored in said memory of said dispenser, with a read operation flag said dispenser responds back to said first microprocessor with response configured by said fuel pump configuration means indicating fueling position, hose number, and unit price stored;

(b) reading a key queue in said card reader by sending a read command configured by said card reader configuration means including read code which is followed by a response configured by said card reader configuration means including reader number and key code;

(c) reading a card queue in said card reader by sending a read command configured by said card reader configuration means including read code which is followed by a response configured by said card reader configuration means including reader number and credit card data;

(d) starting the dispensing process by an authorization command configured by said fuel pump configuration means including command code, fueling position, hose number, and limit Mount of fuel to be dispensed;

(e) polling the status of said dispenser by a status request command configured by said fuel pump configuration means including fueling position and hose number, whereafter said dispenser responds with status indicator response configured by said fuel pump configuration means including hose is dispensing fuel, hose is idle, pump handle has been lifted and (f) reading sales information by a sales information command configured by said fuel pump configuration means including command code, fueling position, hose number, and operational flag, whereas with a read operation flag said dispenser responds to said first microprocessor with response configured by said fuel pump configuration means including pump number, hose number, and amount of fuel dispensed, or with a clear operation flag thereby the sale flag is cleared.

20. A method as defined in claim 19 further comprising the step of setting the blend ratio of fuel to be dispensed by sending a blend command configured by said fuel pump configuration means including pump number, hose number, and percent of hose number one ratio.

21. A fuel pump-cash acceptor control center for controlling a fuel delivery system, used in combination with at least fuel dispenser having a fuel pump means with a first microprocessor for delivering a variable volumetric flow of fuel into a vehicle tank and a cash acceptor means for accepting bills for payment for the fuel dispensed, and a computer means with a third programmable memory device including application software programming for performing cash register function, comprising;

(a) a fuel pump-cash acceptor control means including a printed circuit board with a read-only-memory means for storing operating routines and a read-and-write-memory means for storing a series of commands to control said fuel dispenser and responses from said dispenser during the fueling process, and a dispenser control processor, operatively connected between said first and second programmable memory devices in said dispenser and to said third programmable memory device in said computer means, for (1) reading said second programmable memory device in said cash acceptor means to determine the presence of a customer at said dispenser and how said customer intends to pay for dispensed fuel;

(2) retrieving commands from said read-and-write-memory means in a predetermined sequence and outputting said commands in a readable format to said first programmable memory devise in said pump means causing said dispenser to dispense fuel;

(3) receiving response data from said first programmable memory device during the fueling process and storing said response data in said read-and-write-memory means;

(4) processing and outputting said response data to said third programmable memory device in said computer means through a driver interface program to control the flow of data between the two;

(b) a first configuration means functionally connected between said fuel dispenser control processor and said first programmable memory device in said pump means in said dispenser for translating the communication protocols of the two wherein said commands are readable by said by said first programmable memory device and said response data is readable by said dispenser control processor;

(c) a second configuration means functionally connected said dispenser control processor and said second programmable memory device in said cash acceptor in said dispenser for translating the communication protocols of the two wherein said commands are readable by said second programmable memory device and said response data is readable by said dispenser control processor; and (d) a down-load communication means for down-loading fuel pump and cash acceptor control software to said read-and-write-memory means coupled with said dispenser control processor.

* * * * *